(12) United States Patent
Ubillos (10) Patent No.: US 8,705,938 B2
(45) Date of Patent: *Apr. 22, 2014

(54) PREVIEWING EFFECTS APPLICABLE TO DIGITAL MEDIA CONTENT

(75) Inventor: Randy Ubillos, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,422

(22) Filed: Aug. 13, 2012

(65) Prior Publication Data

US 2012/0308210 A1    Dec. 6, 2012

Related U.S. Application Data

(63) Continuation of application No. 12/184,952, filed on Aug. 1, 2008, now Pat. No. 8,270,809.

(51) Int. Cl.
*H04N 9/80*     (2006.01)
*H04N 9/74*     (2006.01)

(52) U.S. Cl.
USPC ..................... 386/248; 348/333.05

(58) Field of Classification Search
USPC ........................... 348/333; 386/248
See application file for complete search history.

(56) References Cited

U.S. PATENT DOCUMENTS

| | | | | |
|---|---|---|---|---|
| 5,886,692 | A  * | 3/1999 | Brewer et al. | 715/723 |
| 2008/0072166 | A1* | 3/2008 | Reddy | 715/764 |
| 2008/0247726 | A1* | 10/2008 | Lee et al. | 386/52 |
| 2009/0319897 | A1* | 12/2009 | Kotler et al. | 715/711 |

OTHER PUBLICATIONS

Yachi, Masahiro, and Jun Murai. "An active viewing system to utilize streaming video for education." Applications and the Internet Workshops, 2007. SAINT Workshops 2007. International Symposium on. IEEE, 2007.*

* cited by examiner

*Primary Examiner* — Kambiz Zand
*Assistant Examiner* — Michael Guirguis
(74) *Attorney, Agent, or Firm* — Kenyon & Kenyon LLP (57) ABSTRACT

Systems and apparatus are described to perform methods including receiving input to apply attributes that represent modifications to appearance of content of the video segment, to a video segment. Multiple modified video segments are generated, each modified video segment being associated with a corresponding attribute applicable to the video segment. The appearances of the multiple modified video segments vary based on corresponding attributes. A selection of a modified video segment associated with a first attribute is received, and a first video segment is generated by associating the first attribute with the video segment.

20 Claims, 9 Drawing Sheets

PREVIEWING EFFECTS APPLICABLE TO DIGITAL MEDIA CONTENT

CROSS REFERENCE TO RELATED APPLICATION

This application is a continuation of U.S. application Ser. No. 12/184,952, filed Aug. 1, 2008, the entire disclosure of which is incorporated herein by reference.

TECHNICAL FIELD

This specification relates to editing digital media content, for example, video, images, and the like.

BACKGROUND

Digital recording equipment enables users to capture and store digital media content items, for example, video, images, audio, and the like. Software applications enable the users to perform operations on the captured and stored digital media content. Such operations include viewing, editing, and the like. For video segments, the software application's editing operations can include deleting portions of the video segment, combining two or more video segments, overlaying content on a stored video segment, and the like.

In some scenarios, video editing software applications enable users to apply an effect to a video segment to cause a change to an appearance of the video segment. One such effect can be the application of a black-and-white color scheme to a video segment that includes content in color causing the video segment to be displayed in black-and-white. Another example is the application of text causing the text to be superimposed over the video segment. Applying color schemes and adding text are examples of two of several effects that can be added to video segments.

Similarly, other effects can be applied to other types of digital media including images, audio, and the like. When a user wishes to view a result of applying an effect to a digital media content item, then the software application displays the content item with the applied effect in a user interface.

SUMMARY

This specification describes technologies relating to previewing effects applicable to digital media content. In one example, an input is received to apply an effect, for example, a color scheme, to a video segment displayed in a thumbnail in a user interface. Multiple color schemes are available and each of the available color schemes is applied to the video segment to generate multiple modified video segments. Each modified video segment is displayed in a user interface enabling a user to preview the effect of applying the color schemes. In addition, as the user skims, i.e., moves the cursor across, one of the multiple modified video segments, the frames of the video segment with the applied effect are updated within the thumbnail. The user can select one of the modified video segments, and in response, the color scheme applied to the modified segment can be applied to the original content of the video segment. The effect that is applied to the video segment can be any effect and need not be limited to only color schemes. Further, the effect can be applied to any digital media content including images, audio and the like, and need not be limited to video segments alone.

In one aspect, a computer-implemented method is described. The method includes receiving input to apply attributes to a video segment. The attributes represent modifications to appearance of content of the video segment. Multiple modified video segments are generated, wherein each modified video segment is associated with a corresponding attribute of multiple attributes applicable to the video segment. Appearances of the multiple modified video segments vary based on corresponding attributes. A selection of a modified video segment associated with a first attribute is received and a first video segment is generated by associating the first attribute with the video segment.

This, and other aspects, can include one or more of the following features. The method can further include providing the first video segment for display. The method can further include displaying the video segment in a thumbnail in a user interface in the output device. Generating a modified video segment can include applying an attribute of the multiple attributes to the video segment. The method can further include displaying the multiple modified video segments in multiple corresponding thumbnails in the output device. The modified video segment includes the multiple frames. Each position in a thumbnail in which the modified segment is displayed corresponds to a frame in the multiple frames. The method can further include detecting a placement of a cursor at a position in the thumbnail, in response to the detecting, displaying a frame corresponding to the position of the cursor in the thumbnail, detecting a placement of the cursor at a new position in the thumbnail, and displaying a new frame corresponding to the new position in place of the frame in the thumbnail. An attribute can represent an animation. Moving the cursor across the thumbnail can enable viewing an effect that the animation provides to the content of the video segment. An attribute can include a color scheme applicable to the video segment, a title including text associated with the content of the video segment, a font of the text, a font size of the text, and a font color of the text. The title can be included such that the title is displayed over the content. The title can be included before the video segment.

Other aspects include implementations of the above-described method in one or more computer-readable media tangibly embodying a computer program that is operable when executed to cause data processing apparatus to perform the methods described above.

In another aspect, a system includes a processor and a computer-readable medium encoding a computer program product to cause the processor to perform operations including displaying multiple video segments in corresponding multiple thumbnails in a user interface. A video segment includes multiple frames. The multiple video segments include a substantially same content. Each video segment is associated with a corresponding attribute that provides an effect to each video segment. Each position in a thumbnail in which the video segment is displayed corresponds to a frame of the multiple frames. The method includes detecting a movement of a cursor across a thumbnail displaying a video segment. The movement causes the cursor to be located at multiple successive positions in the thumbnail. For each position of the cursor in the thumbnail, the method includes updating the thumbnail to display a corresponding frame of the multiple frames. The updating enables viewing an effect of an associated attribute on the video segment. In response to a selection of the video segment, the method includes displaying the selected video segment with the associated attribute in the user interface.

This, and other aspects, can include one or more of the following features. Updating the thumbnail to display a corresponding frame of the multiple frames includes determining a positioning of a cursor at a first position in the thumbnail, displaying a first frame corresponding to the first position in the thumbnail, determining a change in the positioning of the cursor to a new position in the thumbnail, and displaying a new frame corresponding to the new position in place of the first frame in the thumbnail.

In another aspect, a computer-implemented method includes displaying multiple versions of a video segment, each version corresponding to application of a different attribute that affects an appearance of the corresponding video segment, receiving user input selecting a desired version, and applying an attribute corresponding to the desired version to the video segment.

This, and other aspects, can include one or more of the following features. Receiving user input can further include displaying the multiple versions in corresponding multiple thumbnails, detecting a selection of a thumbnail, wherein the desired version is a version displayed in the selected thumbnail. The selection of the thumbnail can further include selection of the thumbnail using a cursor positioned on the thumbnail. The method can further include detecting a positioning of the cursor at a location in the thumbnail, displaying a frame of multiple frames included in the video segment in the thumbnail, the frame associated with the position of the cursor, detecting a positioning of the cursor at a new location in the thumbnail, and displaying a new frame of the multiple frames associated with the new position of the cursor.

Particular implementations of the subject matter described in this specification can be implemented to realize one or more of the following advantages. Previewing effects applicable to content items enables a user to view a result of applying multiple effects to the same content. This negates a need for the user to apply one effect at a time to a content item and then determine whether the appearance of the content item is satisfactory. Instead, the user can view results of applying multiple effects to the same content item simultaneously. If the content item, or the effect, or both include animations, the user can view an appearance of the animated content item by skimming a thumbnail in which the animated content item is displayed. Upon previewing the content item to which multiple effects have been applied, the user can select a desired effect. Then, the selected effect can be applied to the content item. Each effect is applied to the content item in real time. This decreases the time that a user needs to generate multiple previews, and enhances user experience.

The details of one or more implementations of the specification are set forth in the accompanying drawings and the description below. Other features, aspects, and advantages of the specification will become apparent from the description, the drawings, and the claims.

BRIEF DESCRIPTION OF THE DRAWINGS

Like reference numbers and designations in the various drawings indicate like elements.

DETAILED DESCRIPTION

The systems and techniques described herein can be implemented in software applications configured to enable users to edit digital media content. These systems and techniques enable simultaneous previewing of multiple effects that can be applied to a digital media content item, for example, a video segment. The result of applying any type of effect to any type of digital media content item can be previewed and a desired effect can be selected. In response, the effect is applied to the content in the digital media content item. In some implementations, the content items are displayed in a user interface to enable editing. The user interface is displayed in a display device, for example, a computer monitor of a computer system.

Figure 1A:
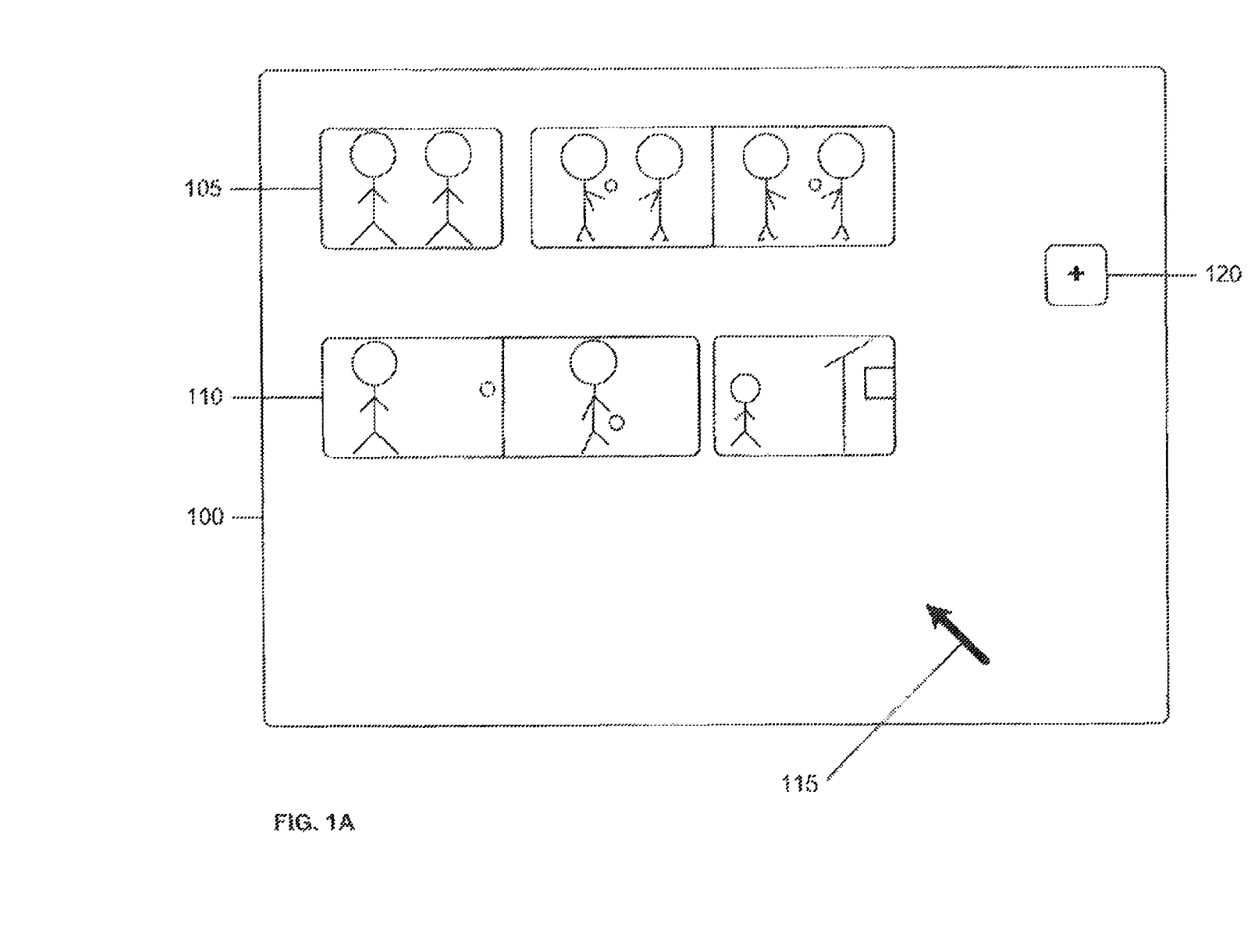
FIGS. 1A-1D are schematics of examples of a user interface for displaying video segments.

FIG. 1A is a schematic of an example of a user interface 100 for displaying video segments. The user interface 100 includes multiple video segments 105, 110, and the like, displayed in multiple thumbnail groups. Each thumbnail group includes at least one thumbnail that is associated with a time period. If the duration of the video clip is less than or equal to the time period associated with the thumbnail, then the video segment 105 is displayed in one thumbnail. If not, then the video segment 105 is displayed across multiple thumbnails in the same thumbnail group. Details related to displaying a video segment across one or more thumbnails are described in U.S. patent application Ser. No. 11/771,761, entitled "Two-dimensional timeline display of media items," filed on Jun. 29, 2007, the entire contents of which are incorporated herein by reference. In the example user interface 100 shown in FIG. 1A, the video segment 105 is displayed in one thumbnail while the video segment 110 is displayed across two thumbnails. A cursor 115, operated by a pointing device, for example, a mouse, is displayed in the user interface 100.

Figure 1B:
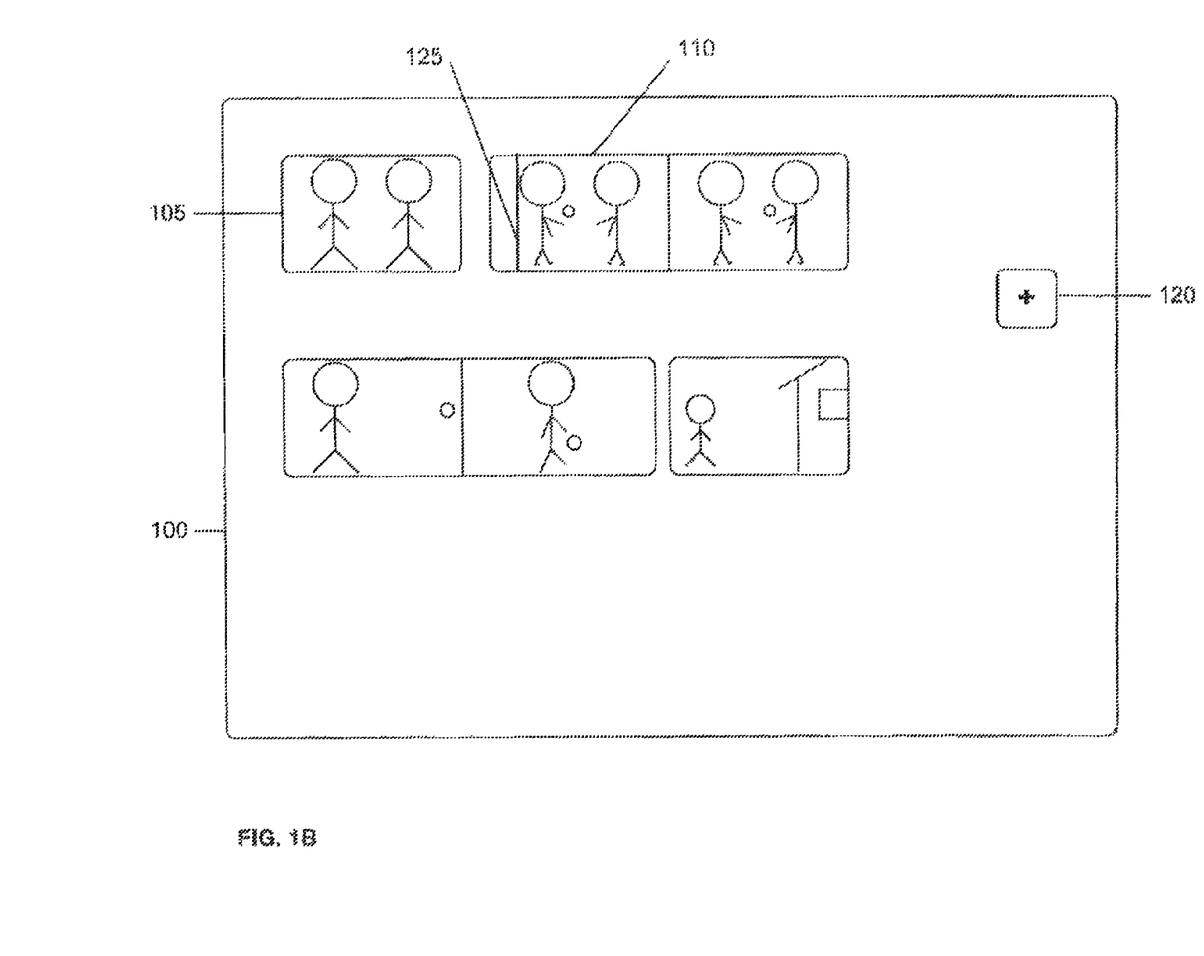

FIG. 1B is a schematic of an example of a user interface 100 for displaying video segments. The movement of the cursor 115 can be controlled using the mouse. When the cursor 115 is positioned over a thumbnail in which a video segment is displayed, the cursor 115 is replaced by a play head 125, for example, a vertical line spanning the vertical dimension of the thumbnail. Subsequently, when the cursor is moved away from the thumbnail, the play head 125 is replaced by the cursor 115. Replacement of the cursor 115 by the play head 125 and vice versa is implemented as changes to an appearance of the cursor 115 and the play head 125 in the user interface 100.

In some implementations, the content of the video segments 105, 110, and the like, are skimmed by moving the cursor 115 over the thumbnail in which a video segment is displayed. The video segment 105 includes multiple frames, each frame representing a still image. Each position in the thumbnail in which the video segment 105 is displayed is associated with one of the multiple frames. While skimming, the cursor 115 is placed at a position over the thumbnail in which the video segment 105 is displayed. In response, the frame associated with the position is detected and displayed within the thumbnail. When the cursor 115 is moved to a new position, a new frame associated with the new position is detected and displayed in the thumbnail in place of the previously displayed frame. In this manner, as the cursor 115 is moved across a thumbnail, the thumbnail is continuously updated to display frames included in the video segment displayed in the thumbnail, allowing previewing content of the video segment. Details related to skimming can also be found in the above-referenced U.S. patent application Ser. No. 11/771,761.

The content of the video segment 105 is captured using suitable equipment, for example, a digital video camera. Upon viewing the content, a user may wish to apply an effect to the content. In some implementations, the user interface 100 includes an effects selector 120, which is a button that can be selected using the cursor 115. Selection of the effects selector 120 causes multiple options to be displayed in the user interface 100, each representing an effect that can be applied to the content of the video segment 105. For example, the effects can be color schemes that can be applied to the video segment to alter the color scheme of the raw content. Multiple color schemes are available and can include bleach bypass color scheme, a sci-fi color scheme, a black and white color scheme, a vignette color scheme, a night vision color scheme, sepia and aged film color schemes, and the like.

Figure 1C:
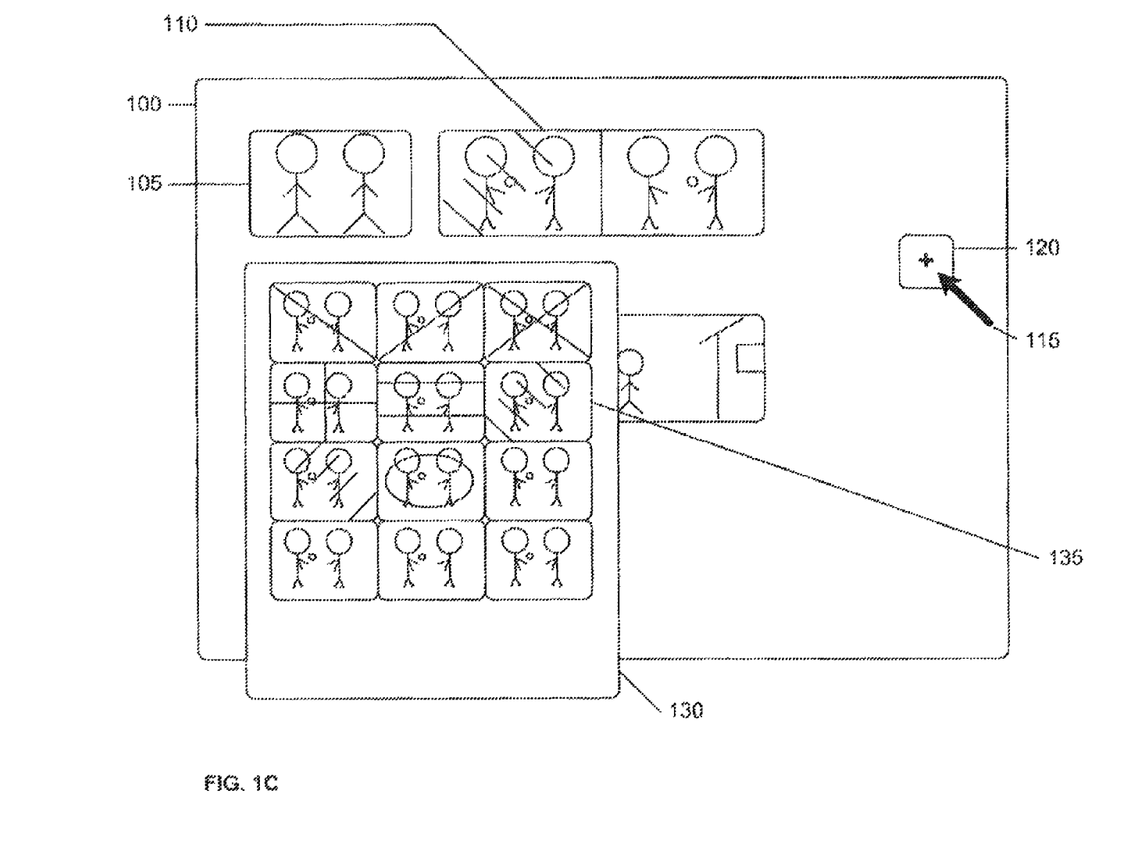

FIG. 1C is a schematic of an example of a user interface 100 for displaying video segments. To alter the color scheme, the video segment 110 is selected, for example, by positioning the cursor 115 on the thumbnail displaying the video segment 110 and clicking the mouse. Subsequently, the effects selector 120 is selected. In response, a preview panel 130 is displayed either over or adjacent to the user interface 100. The preview panel 130 displays multiple thumbnails, each thumbnail displaying a modified video segment. The content of each modified video segment is the same as the content of the video segment 110. Each thumbnail in the preview panel 130 displays the content of the video segment to which one of the multiple available color schemes has been applied.

Figure 1D:
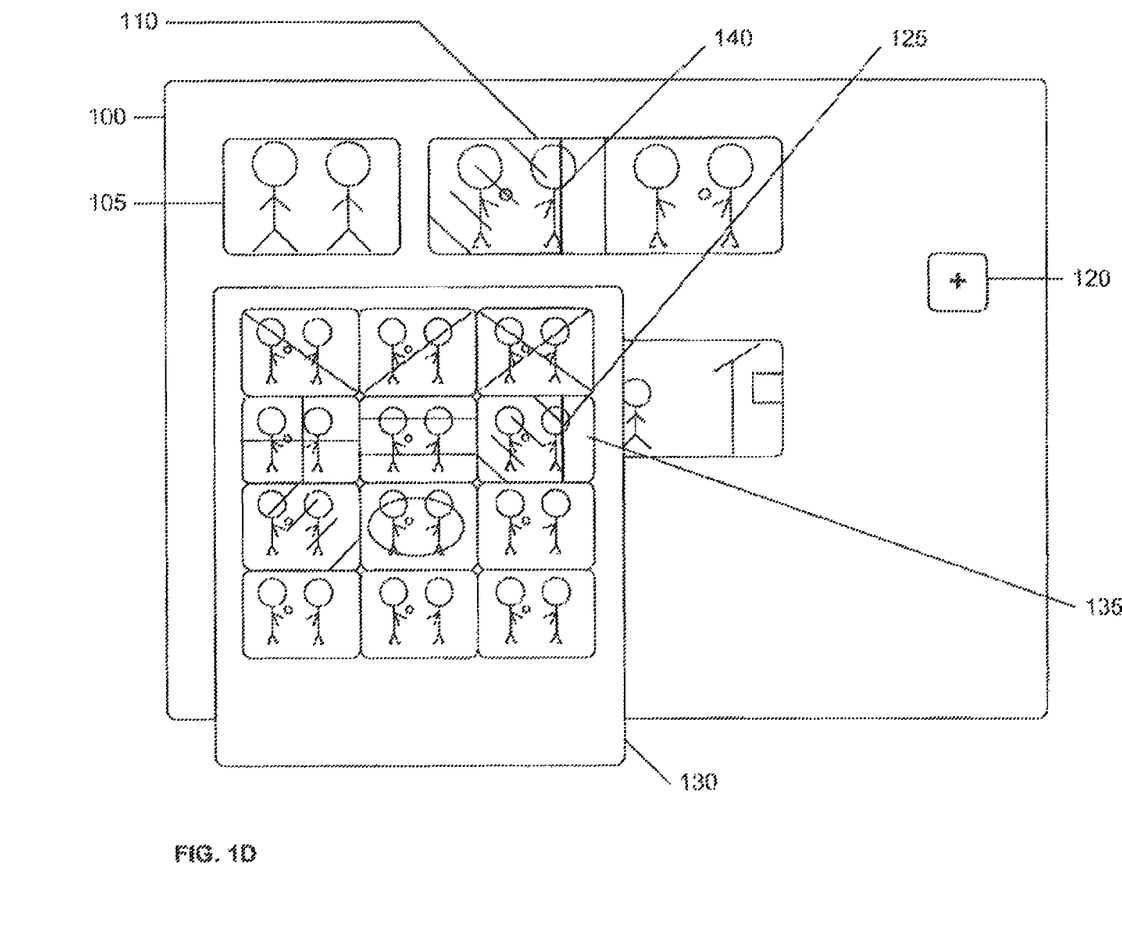

FIG. 1D is a schematic of an example of a user interface 100 for displaying video segments. When the preview panel 130 including the multiple modified video segments is displayed in the user interface 100, the cursor 115 can be positioned over each thumbnail displaying each modified video segment. The positioning of the cursor 115 over the thumbnail 135 represents a selection of the modified video segment in the thumbnail 135. The color scheme that is associated with the thumbnail 135 is also applied to the video segment 110. When the cursor 115 is moved to a new thumbnail in the preview panel 130, then the play head 125 is displayed in the new thumbnail. In addition, the color scheme associated with the new thumbnail is applied to the video segment 110, thereby replacing the previous color scheme. In this manner, every time the cursor 115 is positioned over a different thumbnail in the preview panel 130, the color scheme associated with the thumbnail over which the cursor 115 is positioned is applied to the video segment 110. This enables simultaneous previewing of effects of applying multiple color schemes to the raw content of the video segment.

In addition, each modified video segment displayed in the preview panel 130 can be skimmed to preview the effect of the color scheme on individual frames included in the modified video segment. Each thumbnail in the preview panel 130 includes the multiple frames of the video segment 110. Alternatively, each modified video segment displayed in a thumbnail in the preview panel 110 can include less than all the frames of the video segment 110. For example, the frames corresponding to the first one or two seconds and the last one or two seconds of the video segment 110 can be excluded from the modified video segments. Each position in thumbnail 135 corresponds to a frame in the modified video segment displayed in the thumbnail 135. When the play head 125 is placed at a position in the thumbnail 135, the frame corresponding to the position is displayed in the thumbnail 135. When the play head is moved to a new position in the thumbnail 135, the thumbnail 135 is updated to display a new frame associated with the new position. The color scheme associated with the modified video segment is applied to each frame in the video segment. By skimming to display a particular frame in the thumbnail 135, a user views a result of applying the color scheme to the particular frame.

When the play head 125 is displayed over the selected thumbnail, for example, thumbnail 135, a play head 140 is also displayed over the video segment 110. As described previously, the color scheme associated with the modified video segment in thumbnail 135 is also applied to the video segment 110. While skimming, the position of the play head 125 is continuously moved within the thumbnail 135. The play head 140 is associated with the play head 125 such that the movement of one play head matches that of the other. For example, a movement of the play head 125 towards the left edge of the thumbnail 135 causes a corresponding movement of the play head 140 towards the left edge of the thumbnail in which the video segment 110 is displayed. In this manner, the video segment 110 is also skimmed while skimming a modified video segment displayed in the preview panel 130.

When the play head 125 is displayed at a location away from the preview panel 130, any color scheme that was applied to the video segment 110 is removed, and the raw content of the video segment 110 is displayed. Having skimmed the multiple modified video segments displayed in the preview panel 130, a user selects one of the thumbnails in the preview panel 130. This represents a selection of a color scheme associated with the modified video segment displayed in the selected thumbnail. In response, the selected color scheme is applied to the video segment 110. Subsequently, the preview panel 130 is hidden from display. In some implementations, the user interface 100 can include a separate view pane to view the effects of applying color schemes to content of the video segment 110.

The view pane 205 is larger in dimension in comparison to the thumbnail in which the video segment 110 is displayed. This facilitates better viewing of the content of the video segment 110. To skim the content of the video segment 110, a play head 125, displayed by placing the cursor 115 over the thumbnail in which the video segment 110 is displayed, is provided.

Figure 2:
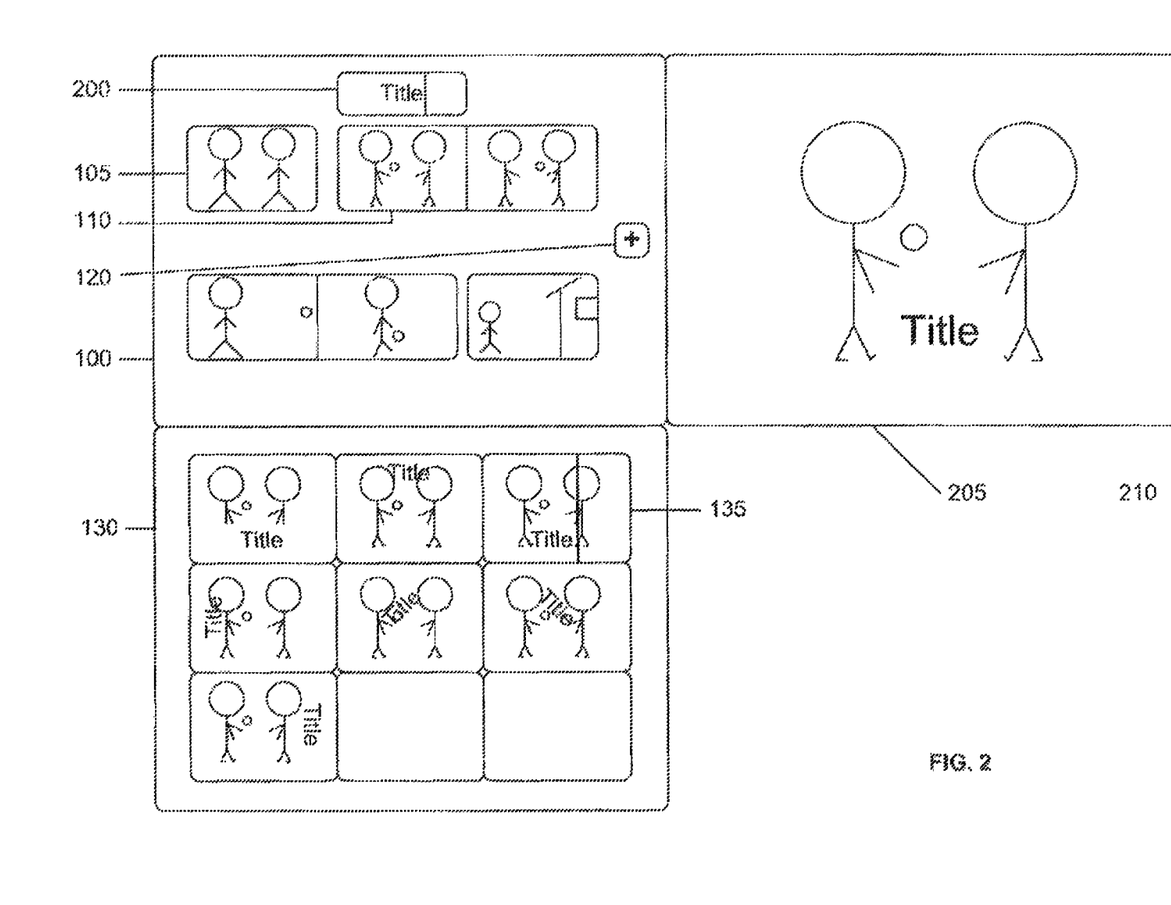
FIG. 2 is a schematic of an example of a user interface for previewing titles added to video segments.

FIG. 2 is a schematic of an example of a user interface 100 for previewing titles added to video segments. A title is one example of content that can be overlaid over the content of the video segments. Other examples include audio tracks that can be added to video segments such that the audio tracks playback when the video segment is played back, cutaways, and the like. When a title is added to a video segment 110 in the user interface 100, a title bar 200 is displayed over the thumbnail in which the video segment 110 is displayed. The width of the title bar 200 is adjustable and represents a duration for which the title is displayed. In default implementations, addition of a title to the video segment 110 causes the title bar 200 to span the horizontal dimension of the thumbnail in which the video segment 110 is displayed. This indicates that the title will be displayed for an entire duration of the video segment 110. The span of the title bar 200 can be altered, for example, by selecting either of the two vertical edges of the title bar 200 and dragging the selected edge. The width of the title bar 200 can be set to span either less or more than the horizontal dimension of the thumbnail in which the video segment 110 is displayed. If less, this indicates that, during playback, the title will be displayed over the video segment 110 for a duration that is less than the duration of the video segment 110. In default implementations, a default text, "Title," is displayed within the title bar 200. The default text can be modified to any text.

Skimming a video segment 110 over which a title is overlaid enables previewing an effect of overlaying a title over the content of the video segment 110. When the video segment 110 with the overlaid title is played back, the title appears as an animation. For example, displaying the title text for a duration as the video segment 110 plays back and hiding the title text at the end of the duration is one form of animation. Causing the title text to fly in from the left edge as the video segment 110 plays back is another form of animation. Thus, several title animations are possible to display the title text over the video segment 110. Such animations can include two lines of text, one line sliding in from each side of the screen, pausing in the middle of the screen, and then sliding out the opposite side of the screen. Other animations include text blurring onto the screen and then backing off. Each title animation represents an effect that can be applied to the content of the video segment 110. Thus, a user can be presented with multiple effects, each effect representing a title animation that the user can apply to a video segment.

In some implementations, the multiple effects representing the title animations are applied to the content of the video segment 110 to generate modified video segments. The modified video segments are simultaneously displayed in corresponding thumbnails in the preview panel 130. For example, a user can perform the following steps to cause the preview panel 130 including the modified video segments with the title animations to be displayed. The user adds a title to the video segment 110. In response, the title bar 205 is displayed over the thumbnail in which the video segment 110 is displayed. The title bar displays default title text within the title bar 205. Subsequently, the user selects the effects selector 120. In response, the preview panel 130 including multiple thumbnails is displayed over or adjacent to the video segment 110. Multiple title animations are overlaid over the content of the video segment 110 to generate multiple modified video segments, each of which is displayed in a corresponding thumbnail in the preview panel 130.

To view a result of applying a title animation to the video segment 110, the user positions the cursor 115 over the thumbnail 135 displaying the title animation, and skims the thumbnail. The modified video segment with the overlaid title animation is also displayed in the view pane 205. In addition, the title animation corresponding to the thumbnail 135 is also applied to the thumbnail in which the video segment 110 is displayed. In this manner, the user previews a result of applying a title animation to a video segment at three locations, namely, a thumbnail in the preview panel 130, a thumbnail in which the video segment 110 is displayed, and a view pane 205.

Subsequent to previewing, a desired title animation is selected. This is done, for example, by selecting a thumbnail in the preview panel 130 in which the video segment is displayed. The desired title animation has been applied to the selected video segment. For example, the user can select the modified video segment by clicking on the thumbnail with the mouse. In response, the title animation is applied to the thumbnail in which the video segment 110 is displayed. Then, the preview panel 130 is hidden from display.

Figure 3:
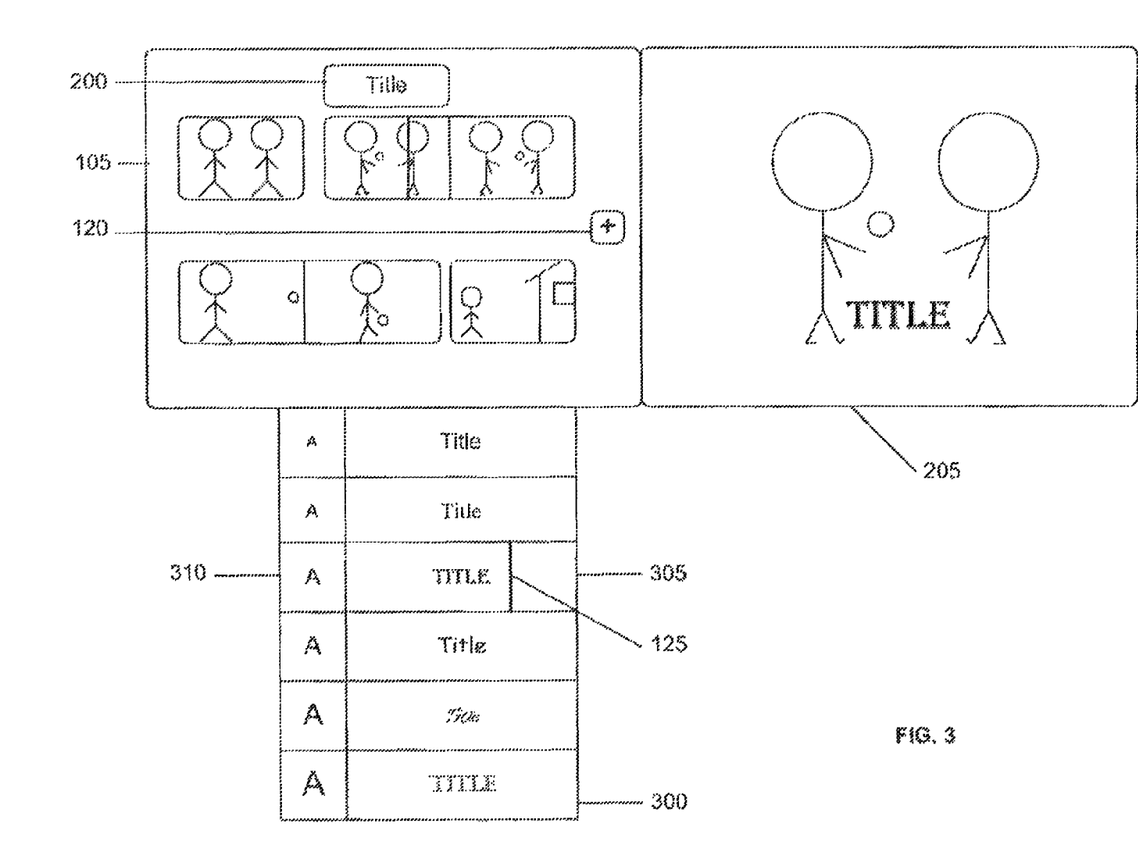
FIG. 3 is a schematic of an example of a user interface for previewing text fonts.

FIG. 3 is a schematic of an example of a user interface 100 for previewing text fonts. In the example shown in FIG. 3, the user has previewed the multiple title animations, and selected a title animation to be applied to the video segment 110. In default implementations, the title text of the title animation is displayed in a default font, for example, Times New Roman. Alternatively, one of any available number of fonts can be chosen as the default font. In some implementations, after an addition of the title bar 200 to a video segment 110 and a selection of a title animation, a selection of the effects selector 120 causes the display of a fonts panel 300 in which the title text is displayed in multiple available fonts.

The fonts panel 300 includes multiple cells, each cell having an associated font and displaying the default text in the associated font. In some implementations, the multiple cells can be arranged in a column. Alternatively, the multiple cells can be arranged in a row or in an array. When the cursor 115 is positioned over a cell 305 in the fonts panel 300, the cursor 115 is replaced by the play head 125, and the video segment 110 to which the title animation is applied is displayed in the view pane 205. When the play head 125 is moved across the cell 305, the video segment 110 with the applied to title animation is skimmed in the view pane 205. At the same time, the font associated with the cell 305 is applied to the title text in the title animation that is applied to the video segment 110.

This enables a user to preview a result of applying a particular font to the title text in the title animation. To view a result of applying a different font, the user moves the cursor to a different cell causing the play head 125 to be displayed in the different cell. In response, the font associated with the different cell is applied to the title text in the title animation displayed in the view pane 205. The user skims the different cell to preview the title animation. In addition, the title text with the title animation and the font being previewed is displayed in the thumbnail in which the video segment is displayed. Subsequent to previewing, the user selects a font, for example, by selecting the cell associated with the font. In response, the selected font is applied to the title text in the title animation.

In some implementations, a result of changing parameters of the title text font, for example, font size, font color, and the like, can also be previewed. For example, a second column can be displayed in the fonts panel. In the second column, a character can be displayed in multiple font sizes. When the play head 125 is positioned in a cell 305 associated with a font, the characters in the second column, that are of different sizes, can be displayed in the font associated with the cell 305. The play head 125 can be horizontally moved to the second column, and then vertically moved over the cells of the second column. When the play head is positioned over a cell 310 in the second column, the font size associated with the cell 310 is applied to the title text. Subsequently, the title animation is updated, almost instantaneously, to display the title text in the font size associated with the cell 310. This enables a user to preview the font sizes for the title text. The user can select one of the font sizes by selecting the cell associated with the font size.

While the example fonts panel 300 in FIG. 3 displays multiple available font sizes, any parameter of the title text font can be displayed. For example, the cells in the second column can display the title in multiple available colors. When a font is selected by placing the play head 125 over a cell in the fonts panel 300, the user can move the play head 125 to the adjacent column, scan the column to select the cell that displays the title text in the desired font color. These operations can be extended to all parameters of the title text font.

Figure 4A:
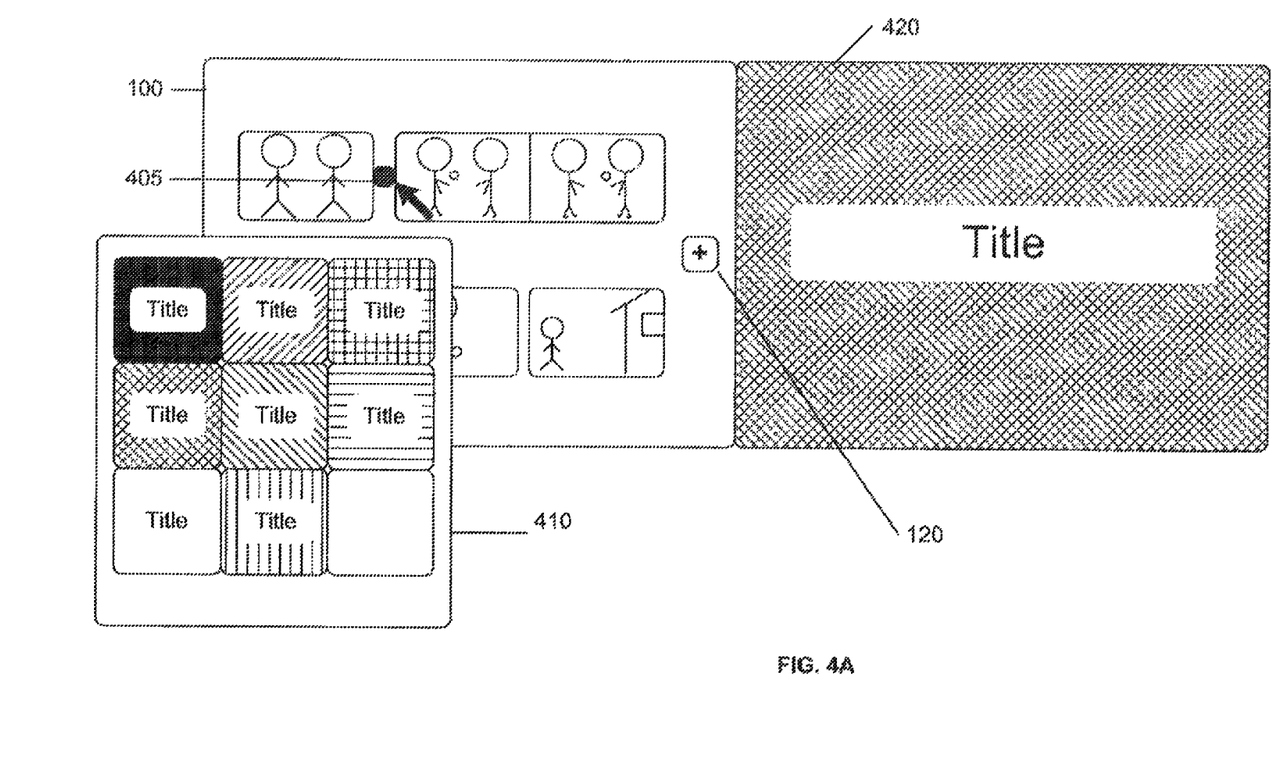
FIGS. 4A and 4B are schematics of examples of a user interface for displaying text against backgrounds.
Figure 4B:
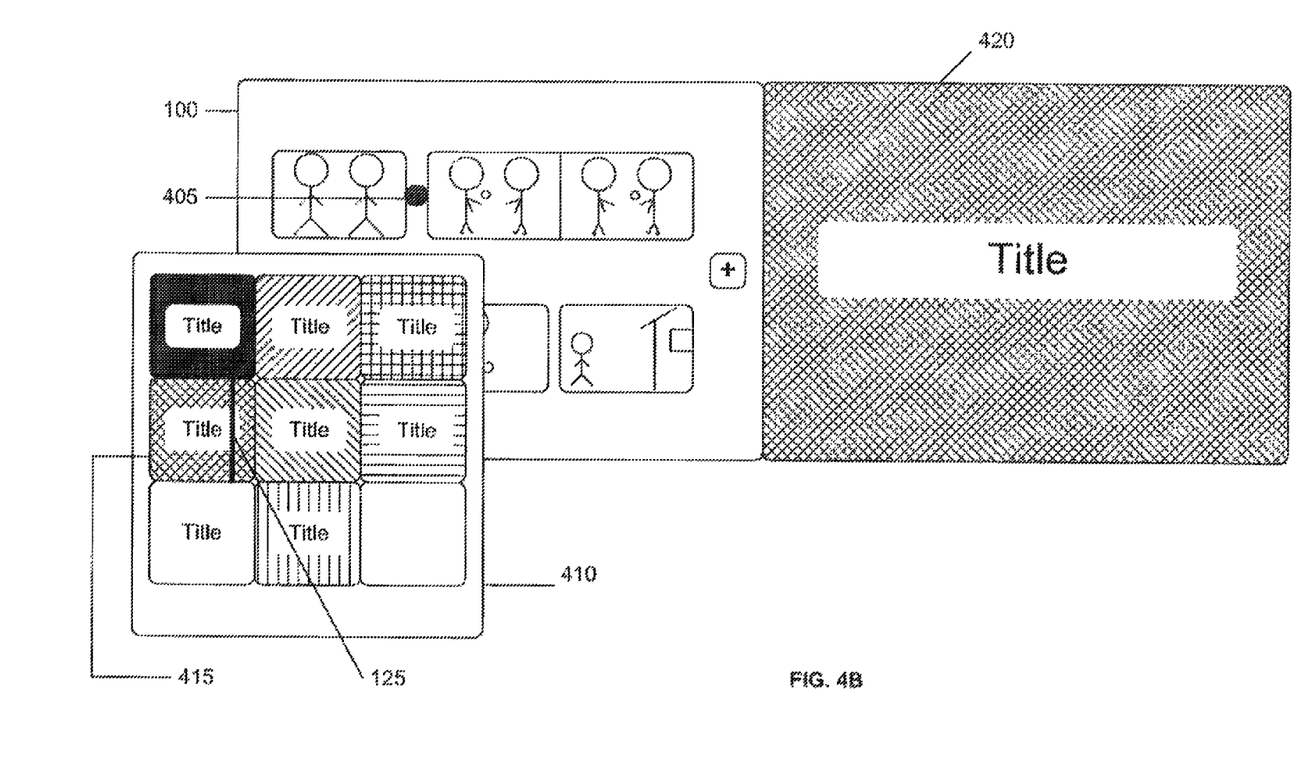

FIGS. 4A and 4B are schematics of examples of a user interface 100 for displaying text against backgrounds. In the previous example, the title text was displayed over the content of the video segment 110 when the video segment 110 was played back. In some scenarios, the title text can be inserted between two video segments. For example, during playback, the title text can be displayed for a duration and then hidden from display. Subsequently the video segment can be played back. The title text can serve as an introduction to the content of the video segment. In some implementations, the title text can be displayed against an animated background.

As illustrated in FIG. 4A, the user interface 100 displays multiple video segments, each video segment at displayed in either one thumbnail or distributed across multiple thumbnails. To insert a title against a background, a user selects the effects selector 120 causing a background control 405 to be displayed in the user interface 100. In some implementations, the background control 405 is displayed at the location of the cursor 115. The user can move the background control 405 to a location between two video segments. In alternative implementations, the background control 405 is displayed at any location within the user interface 100. The user can select the background control 405 and move it to a desired location.

When the background control 405 is positioned between two video segments, a default background including a default text is displayed in the view pane 420. The default background can be one of multiple available backgrounds. The multiple available backgrounds including the default text can be arranged in an array of thumbnails and displayed in the user interface in the preview panel 410. In some implementations, the backgrounds are static designs. In other implementations, the backgrounds are animated such that either the design in the background or the included text or both are displayed as animations. Thus, each thumbnail in the preview panel 410 displays an animated background including the default title text. The user skims each thumbnail to preview an appearance of the background and the title text in the view pane 205 and in the thumbnail included in the preview panel 410. To select a desired background, the user selects the thumbnail in the preview panel 410 displaying the desired background.

After inserting a background between video segments, the user can provide input to detect a second background between two other video segments. The first background that the user selected is stored in memory. When the preview panel 410 is displayed to enable previewing to allow a user to select the second background, the cursor 115 is positioned over the thumbnail displaying the background that was previously selected. This allows the user to select the previously applied background without requiring moving the cursor to the corresponding thumbnail. FIG. 4B illustrates a positioning of a cursor 115 over one of the thumbnails 415 in the preview panel 410, that causes a play head 125 to be displayed. The background associated with the thumbnail 415 is also displayed in the preview pane 420.

The multiple available effects that are displayed in the preview panels illustrated in the example user interfaces described previously are selected from among a larger group of effects that are available for application. In some implementations, the user can alter one or more of the multiple available effects that are displayed in the preview panels. Alternatively or in addition, an effect that is preferred by the user can be determined, for example, by tracking the effects that a user regularly applies to the video segment. Subsequently, the multiple available effects displayed in the preview panels can be replaced with the user's choices. In some implementations, the number of multiple effects are displayed in the preview panels can be altered based on user input. The generation of modified video segments that display a selected video segment to which the multiple available effects have been applied, is performed in real-time.

Figure 5:
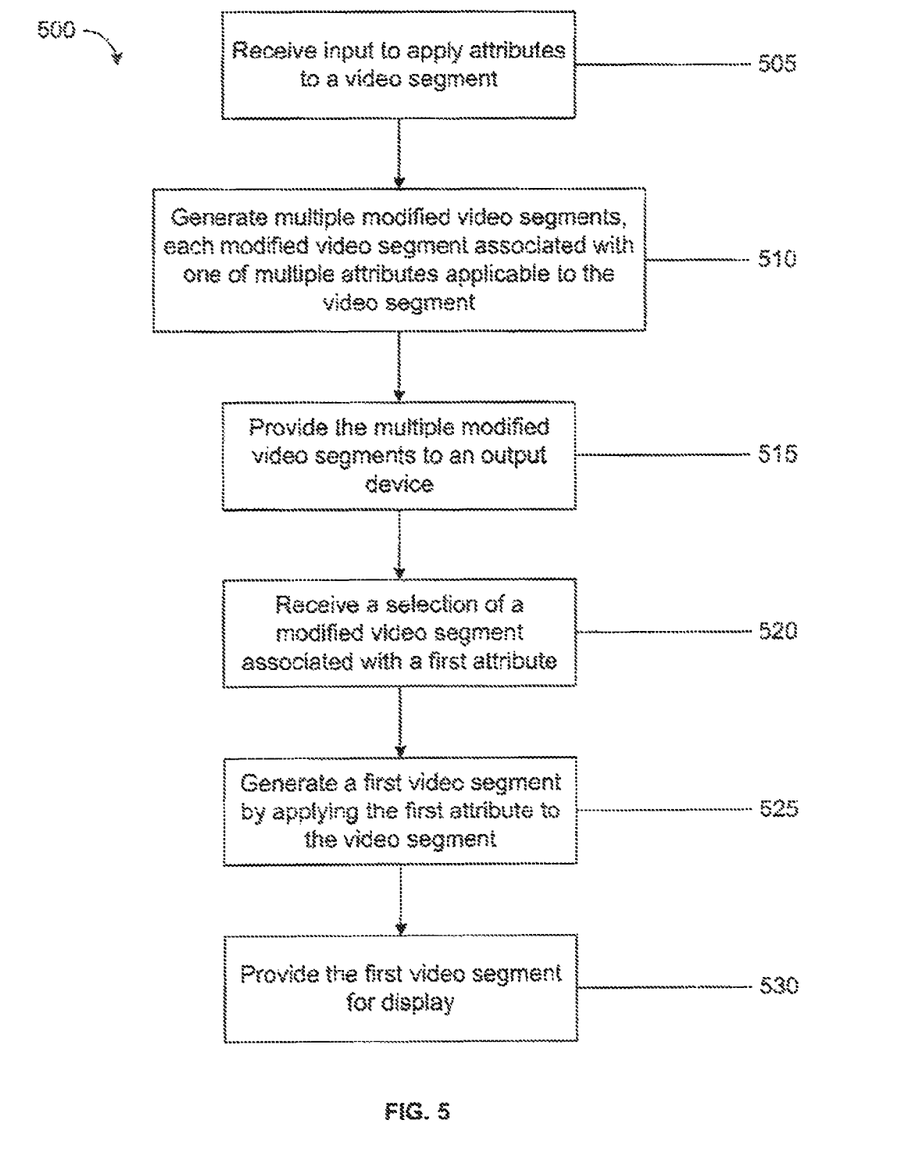
FIG. 5 is a flowchart of an example process to enable previewing applications of effects to video segments.

FIG. 5 is a flowchart of an example process 500 to enable previewing applications of effects to video segments. The process 500 receives input to apply attributes to a video segment (step 505). Each attribute represents an effect that can be applied to the video segment. The video segment represents the original content to which an effect is to be applied. For example, the process 500 can be executed by a software application installed on a computer system, for example, a desktop computer, a laptop computer, and the like. Alternatively, the software application can be installed on a remote server operatively coupled to a computer system via one or more networks, for example, a local area network (LAN), a wide area network (WAN), the Internet, and the like. The input can be received from a user of the computer system. The input specifies the type of effect that needs to be applied to video segments.

The process 500 generates multiple modified video segments (step 510). Each modified video segment is associated with one of the attributes applicable to the video segment. For example, the software application receives input that an effect to be applied to a video segment is a color-scheme. In response, the software application applies multiple available color schemes to the video segment to which the color scheme is to be applied. In some implementations, each color scheme is stored in a module, for example, as a quartz composition. The content of the video segment is supplied to each module. The module can include code that applies the color scheme associated with the module to the content received by the module. The quartz compositions can be executed using the Quartz Composer software that is part of the Mac OS software development package.

The process 500 provides the multiple modified video segments to an output device (step 515). In implementations where the software application is installed on a remote server, after generating the multiple modified video segments, the server transmits the multiple modified video segments over the network, for example, the Internet, to an output device. The output device can be a computer monitor in which a user interface is displayed. The multiple modified video segments are displayed in the user interface.

The process 500 receives a selection of a modified video segment with a first attribute (step 520). When the user selects one of the displayed multiple modified video segments, the selection is provided to the software application. The user selects the modified video segment based on a first attribute, namely, the effect associated with the modified video segment. The selection can be detected by a mouse-click in the user interface in the output device. Alternatively, the selection can be detected as a touch on a screen with a stylus, the user's finger, and the like.

The process 500 generates a first video segment by applying the first attribute to the video segment (step 525). For example, upon receiving the selected effect, the software application feeds the content of the original video segment into the module associated with the selected effect to apply the selected effect to the original content. Alternatively, the software application selects an existing modified video segment that was previously generated to enable previewing. The existing modified video segment represents the original content to which the selected effect has been applied.

The process 500 provides the first video segment for display (step 530). For example, the software application displays the first video segment in place of the video segment displaying the original content in the output device. In some scenarios, the video segment that displays the original content can be the raw content that was captured by the recording equipment. In other scenarios, the user can have previously applied an effect, for example, a color scheme, to a video segment. The user can replace such a video segment with a first video segment by performing the operations described with reference to FIG. 5.

In some implementations, the software application displays the video segment including the original content in a thumbnail in a user interface in the output device. Similarly, the software application can display the multiple modified video segments in corresponding thumbnails as described with reference to FIGS. 1A-4. Each thumbnail can be skimmed as previously described.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the specification or of what may be claimed, but rather as descriptions of features specific to particular implementations of the specification. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the specification have been described. Other implementations are within the scope of the following claims. For example, the actions recited in the claims can be performed in a different order and still achieve desirable results. In some implementations, multiple effects can be combined to form an effects group. For example, an effects group can include a bleach bypass color scheme, a Times New Roman font of size 12 and color blue. In this manner, multiple effects groups can be created and provided. The preview panel can display a result of applying multiple effects groups to a single video segment, thereby enabling a user to select an effects group.

What is claimed is:

1. A computer-implemented method comprising:
   displaying a digital media item in a user interface, wherein the digital media item includes content;
   receiving input that indicates that the digital media item is selected to be applied with attributes, the attributes representing different types of modifications to appearance of the content of the digital media item;
   in response to receiving the input, generating a plurality of modified digital media items, wherein each modified digital media item is associated with a corresponding attribute of a plurality of attributes applicable to the digital media item, wherein appearances of the plurality of modified digital media items vary based on corresponding attributes, and wherein each modified digital media item displays substantially the same content of the digital media item modified according to the corresponding attribute;
   receiving a selection of a modified digital media item associated with a first attribute; and
   generating a first digital media item by associating the first attribute with the content of the digital media item.

2. The method of claim 1, further comprising providing the first digital media item for display in the user interface in place of the digital media item.

3. The method of claim 1, further comprising displaying the digital media item in a thumbnail in a user interface in the output device.

4. The method of claim 1, wherein generating a modified digital media item comprises applying an attribute of the plurality of attributes to the digital media item.

5. The method of claim 1, further comprising displaying the plurality of modified digital media items in a plurality of corresponding thumbnails in the output device, the modified digital media item including a plurality of frames.

6. The method of claim 5, wherein each position in a thumbnail in which the modified segment is displayed corresponds to a frame in the plurality of frames, the method further comprising:
   detecting a placement of a position indicator at a position in the thumbnail;
   in response to the detecting, displaying a frame corresponding to the position of the position indicator in the thumbnail;
   detecting a placement of the position indicator at a new position in the thumbnail; and
   displaying a new frame corresponding to the new position in place of the frame in the thumbnail.

7. The method of claim 6, wherein an attribute represents an animation, and wherein moving the cursor across the thumbnail enables viewing an effect that the animation provides to the content of the digital media item.

8. The method of claim 1, wherein an attribute includes one of a color scheme applicable to the digital media item, a title including text associated with the content of the digital media item, a font of the text, a font size of the text, and a font color of the text.

9. The method of claim 8, wherein the title is included such that the title is displayed over the content.

10. The method of claim 8, wherein the title is included before the digital media item.

11. The method of claim 1, further comprising displaying the plurality of modified digital media items in the user interface concurrently with the digital media item.

12. A non-transitory computer readable medium storing program instructions executable by a computer processor to perform:
   displaying a digital media item in a user interface, wherein the digital media item includes content;
   receiving input that indicates that the digital media item is selected to be applied with attributes, the attributes representing different types of modifications to appearance of the content of the digital media item;
   in response to receiving the input, generating a plurality of modified digital media items, wherein each modified digital media item is associated with a corresponding attribute of a plurality of attributes applicable to the digital media item, wherein appearances of the plurality of modified digital media items vary based on corresponding attributes, and wherein each modified digital media item displays substantially the same content of the digital media item modified according to the corresponding attribute;
   receiving a selection of a modified digital media item associated with a first attribute; and
   generating a first digital media item by associating the first attribute with the content of the digital media item.

13. The non-transitory computer readable medium of claim 12, further performing providing the first digital media item for display in the user interface in place of the digital media item.

14. The non-transitory computer readable medium of claim 12, further performing displaying the digital media item in a thumbnail in a user interface in the output device.

15. The non-transitory computer readable medium of claim 12, wherein generating a modified digital media item comprises applying an attribute of the plurality of attributes to the digital media item.

16. The non-transitory computer readable medium of claim 12, further performing displaying the plurality of modified digital media items in a plurality of corresponding thumbnails in the output device, the modified digital media item including a plurality of frames.

17. The non-transitory computer readable medium of claim 16, wherein each position in a thumbnail in which the modified segment is displayed corresponds to a frame in the plurality of frames, further performing:
   detecting a placement of a position indicator at a position in the thumbnail;
   in response to the detecting, displaying a frame corresponding to the position of the position indicator in the thumbnail;
   detecting a placement of the position indicator at a new position in the thumbnail; and
   displaying a new frame corresponding to the new position in place of the frame in the thumbnail.

18. The non-transitory computer readable medium of claim 17, wherein an attribute represents an animation, and wherein moving the cursor across the thumbnail enables viewing an effect that the animation provides to the content of the digital media item.

19. The non-transitory computer readable medium of claim 12, wherein an attribute includes one of a color scheme applicable to the digital media item, a title including text associated with the content of the digital media item, a font of the text, a font size of the text, and a font color of the text.

20. The non-transitory computer readable medium of claim 19, wherein the title is included such that the title is displayed over the content.

\* \* \* \* \*